United States Patent Office 3,344,064
Patented Sept. 26, 1967

3,344,064
FLUOROCARBON-MODIFIED POLYURETHANE ELASTOMERIC COMPOSITIONS
James D. Brady and Joseph G. Di Pinto, Wilmington, Del., assignors to E. I. du Pont de Nemours and Company, Wilmington, Del., a corporation of Delaware
No Drawing. Filed July 19, 1963, Ser. No. 296,363
6 Claims. (Cl. 252—12)

This invention is directed to polyurethane elastomeric compositions. More particularly, this invention is directed to polyurethane elastomers modified with certain wax-like fluorocarbon compounds.

There is a growing need and wider application for rubber-like compositions having low coefficients of friction. Such rubber-like compositions having low coefficients of friction find varying uses such as sleeve bearings for rotating shafts and other applications where sliding friction is encountered. Rubber-like materials, in general, are unsuitable for such applications because of their high coefficients of friction.

Various attempts have been made to lower the coefficient of friction of rubber-like materials. One such method has been to incorporate commercially available high molecular weight polytetrafluoroethylene into the rubber-like material. The coefficient of friction is indeed lowered by this method but not as much as desired.

The present invention is concerned with rubber-like materials known as polyurethanes. Polyurethanes are well known materials and have a wide variety of properties depending on their compositions. Polyurethanes are also easily modified by the addition of various materials.

It is, therefore, an object of this invention to provide novel modified polyurethane elastomers.

It is another object of this invention to provide novel modified polyurethane elastomers having low coefficients of friction.

It is still another object of this invention to provide novel modified polyurethane elastomer materials having lower coefficients of friction than previously known modified polyurethane elastomers.

These and other objects will become apparent from the following description and claims.

More specifically, the present invention is directed to a nonhomogeneous mixture comprising a liquid, curable polyurethane prepolymer and from about 1% to about 90% by weight, based on the weight of the mixture, of small particles of a solid fluorocarbon compound having a molecular weight from about 500 to about 50,000, a melting point of from 90° C. to 327° C., consisting of a chain of units having the structure —$CF_2CF_2$— and containing at least 90% by weight of said —$CF_2CF_2$— units.

The present invention is also directed to the solid polyurethane-fluorocarbon mixture obtained by curing the liquid polyurethane prepolymer hereinbefore described by conventional means.

The present invention is also directed to a sleeve bearing wherein the sleeve of the bearing contacting the rotating shaft is formed from the cured solid polyurethane-fluorocarbon mixture hereinbefore described.

The liquid, curable polyurethane prepolymers which are useful in this invention are prepared by reacting together an organic diisocyanate and a high molecular weight polyol. An excess of the diisocyanate is used so that the resulting liquid product contains free isocyanate groups. These reaction products are referred to as prepolymers since they can be further polymerized.

The compositions of the present invention are formed by mixing the polyurethane prepolymer with the above defined fluorocarbon compound to form a dispersion of the latter in the former. The fluorocarbon compound can be dispersed in either liquid or solid uncured polyurethane; however, it is preferred for purposes of uniform dispersion to disperse the fluorocarbon compound in liquid polyurethane prepolymer. This mixture or dispersion is then converted to a solid by chain extending or crosslinking the polyurethane prepolymer, i.e., the process usually known as curing.

The higher molecular weight glycols used in preparing the polyurethane prepolymers in the present invention include such materials as polyalkylene ether glycols, polyalkylene ether thioether glycols, polyalkylenearylene ether glycols, polyaliphatic hydrocarbon glycols, linear polyester glycols and polyester amide glycols. These glycols usually have molecular weights in the range of 500 to 3000. Some representative examples of these glycols are polyethylene glycol, polypropylene glycol, poly(ethylenepropylene) glycol, polytetramethylene glycol, the polyester reaction product of adipic acid and ethylene glycol having terminal hydroxyl groups, the reaction product of lactones such as caprolactone with diols such as ethylene glycol or amino alcohols such as diethanolamine, the reaction product of 4,4'-dihydroxydiphenylmethane and other aliphatic glycols such as hexamethylene glycol, octylene glycol, decamethylene glycol and related compounds with ethylene or propylene oxides. Of these glycols, polytetramethylene ether glycols in the molecular weight range of 850–3000 are preferred. It is often preferred to mix such polytetramethylene ether glycols in the preferred molecular weight range with up to about one mole per mole of polytetramethylene ether glycol, of a lower molecular weight glycol such as ethylene glycol, diethylene glycol, 1,3-butanediol, 1,4-butanediol, 1,3-propanediol, 2,2-dimethyl-1,3-propanediol or 2-methyl-2-ethyl-1,3-propanediol.

Both aromatic and aliphatic diisocyanates are useful but the aromatic are generally preferred. Some examples are toluene-2,4-diisocyante, toluene-2,6-diisocyanate and mixtures of these two, 4,4'-diisocyanatodiphenylmethane, 4,4'-diisocyanatodiphenyl, naphthalene-1,5 diisocyanate, naphthalene - 1,4-diisocyanate, naphthalene-2,5-diisocyanate, naphthalene-2,7-diisocyanate, 1,3-phenylenediisocyanate, 3,3' - dimethyldiphenyl-4,4'-diisocyanate, 3,3'-dimethyldiphenylmethane-4,4'-diisocyanate, hexamethylene diisocyanate, decamethylene diisocyanate, 3,3'-dimethoxydiphenyl - 4,4' - diisocyanate, 3,3'-dichlorodiphenyl-4,4'-diisocyanate and similar diisocyanates which are well known to the art. The toluene diisocyanates are preferred in this invention, particularly toluene-2,4-diisocyanate or its mixtures with 2,6-diisocyanate.

The preparation of the prepolymers of this invention involves reacting together a mixture of a diisocyanate and glycol, preferably containing from 1.5 to 2.0 moles of glycol, preferably containing from 1.5 to 2.0 moles of diisocyanate per mole of glycol, generally with heat and agitation and often in the presence of a tin catalyst such as tin 2-ethylhexanoate. The reaction product requires no further treatment and is used directly as the prepolymer of this invention.

The fluorocarbon compound is added to the prepolymer either by dispersing the finely divided solid in the prepolymer or, preferably, by mixing a dispersion of the solid fluorocarbon compound in an inert, volatile solvent such as 1,1,2-trichloro-1,2,2-trifluoroethane into the prepolymer and evaporating the solvent from the prepolymer, generally with heat and reduced pressure.

The fluorocarbon compounds useful in this invention are compounds having a chain of —$CF_2CF_2$— groups and can be characterized by the structure $X(CF_2CF_2)_nY$. These compounds to be useful in this invention must also have melting points of from 90° C. to 327° C. The liquid melts of these compounds are relatively free flowing, being considerably less viscous than their corresponding solids. These fluorocarbon compounds must also have molecular weights of from 500 to 50,000, hence $n$ will have values of from about 5 to 500. The X and Y of the structure are the end groups of the fluorocarbon chain. They may be single atoms such as hydrogen or the halogens, i.e. fluorine, chlorine, bromine or iodine. They may also be the groups resulting from the telomerization of tetrafluoroethylene. Tetrafluoroethylene is known to telomerize with a variety of telogens. Representative examples of several of these telogens are disclosed in U.S. Patents 2,411,158, 2,411,159, 2,433,844, 2,540,088, 2,559,628, 2,559,629, 2,559,754, 2,562,547, 3,019,261, and 3,067,262. In addition to those telogens disclosed in the preceding patents, a number of useful telomers are disclosed in British Patent 583,874. The useful telomers $Br(CF_2CF_2)_nBr$ may be prepared as described in U.S. 3,055,953. Useful telomers may also be prepared by reaction of tetrafluoroethylene with $CF_3Br$ or $CF_2Br_2$ using a method described in U.S. 2,875,253 to form similar products. Still other useful fluorocarbons may be prepared from tetrafluoroethylene and $SO_2Cl_2$ as described in U.S. 2,837,580. Since within the large group of products disclosed in the above patents there are included liquids and low melting solids, it is to be understood that only those products having molecular weights of 500–50,000 and melting points of 90°–327° C. are useful in this invention.

Still another source of useful fluorocarbon compounds containing —$CF_2CF_2$— groups is the degradation of commercial high molecular weight polytetrafluoroethylene as described in U.S. Patent 2,496,978. The nature of the end groups X and Y of $X(CF_2CF_2)_nY$ in these degraded polymers has not, as yet, been disclosed or determined.

The nature of the end groups X and Y of the fluorocarbon compound has no effect on the usefulness of these compounds in this invention. Hence, any fluorocarbon compound $X(CF_2CF_2)_nY$ wherein X and Y are atoms or the residue of simple molecules such as heretofore described are useful in this invention providing they meet the required melting point and molecular weight. The preferred fluorocarbon compounds are those prepared by the telomerization of tetrafluoroethylene with an active telogen in the presence of trichlorotrifluoroethane reaction solvent as described in U.S. Patent 3,067,262. The fluorocarbon compounds described in U.S. Patent 3,067,262 have molecular weights in excess of about 1300. The higher molecular weight fluorocarbon compounds are preferred because these compounds are less volatile and therefore may be used in polyurethane bearings and other applications which are exposed to elevated temperatures for long periods of time. The lower molecular weight fluorocarbon compounds are somewhat volatile at elevated temperatures although they are quite useful at ordinary temperatures.

Fluorocarbon compounds $X(CF_2CF_2)_nY$ which are liquid below 90° C. or have molecular weights below about 500, or both, are not useful in this invention since they either will not remain in the polyurethane, do not give the desired improvement in coefficients of friction or have undesirable effects on the properties of the polyurethanes. Similarly, commercial high molecular weight polytetrafluoroethylene ("Teflon"—a registered Du Pont trademark for polytetrafluoroethylene), which usually has a molecular weight over 1,000,000, is not as useful in forming polyurethane compositions having low coefficients of friction as the hereinbefore defined fluorocarbon compounds of this invention. Commercial polytetrafluoroethylene does not melt to a liquid having a much lower viscosity than the solid. The necessity of using a fluorocarbon compound having a free flowing melt to successfully form the novel compositions of this invention is not understood but is real. Fluorocarbon compounds which do not have essentially the structure $X(CF_2CF_2)_nY$, e.g., cotelomers of hexafluoropropylene and tetrafluoroethylene or chlorotrifluoroethylene polymers, are also not useful in this invention. They either do not give the desired reductions in coefficient of friction or they are relatively soluble in the polyurethanes and affect the properties thereof.

The liquid polyurethane prepolymers having the fluorocarbon compound dispersed therein are cured to a solid either by chain extending or crosslinking. The reagents which cause chain extending or crosslinking are certain diamines, polyols, aminoalcohols or water. The curing agent is added to the prepolymer with good mixing and the resulting mixture is poured into molds, pans or the like and heated at about 70°–120° C. to complete the curing reaction. Curing times vary with the particular curing reagents used, i.e., polyamines usually require 1–3 hours, polyols up to 6 hours. When water is used as the curing agent, the prepolymer is exposed to moist air until curing is complete which usually requires several days. Water curing is used with thin films or coatings of the polymer compositions only. Curing of large bulks or thicknesses of prepolymer with water can result in foams.

The amine curing agents should have $pK_b$ values of at least 11.7. More basic amines react too rapidly, mixing becomes difficult and heterogeneous products often result. Useful amine curing agents are usually arylene diamines such as 3,3′-dichloro-4,4′-diaminodiphenylmethane, 4,4′-diaminodiphenyl disulfide, 3,3′-dichloro-4,4′-diaminodiphenyl, 4,4′-diaminodiphenylsulfone and 4,4′-diaminodiphenylmethane. Of these 3,3′-dichloro-4,4′-diaminodiphenylmethane is especially preferred.

The polyol curing agents include mixtures of glycols such as 1,4-butanediol, triethylene glycol, 2,2-dimethyl-1,3-propanediol, glycerol monophenyl ether or thiodiethylene glycol with triols such as trimethylol propane, triethanolamine or tetraols such as tetrakis(2-hydroxypropyl)ethylene diamine and similar reaction products of alkylene polyamines with alkylene oxides (the "Quadrols" sold by Wyandotte Chemicals Corp.). The reaction products of alkylene polyamines with alkylene oxides are illustrated in U.S. Patents 2,697,118 and 2,884,459.

Usually about 0.70 to 1.05 equivalents, and preferably 0.85 to 1.00 equivalent, of curing agent per equivalent of isocyanate group in the prepolymer are used. The equivalent weight is the molecular weight divided by the number of reactive groups and is easily determined by standard analyses for these compounds. For mixtures, averaged equivalent weights are used.

Cured polyurethane compositions containing the heretofore defined fluorocarbon compounds have surprisingly lower coefficients of friction than the same polyurethanes containing "Teflon," a commercial high molecular weight polytetrafluoroethylene. The concentration of fluorocarbon compound may vary from about 1% to about 90% by weight based on the total weight of the final mixture of the fluorocarbon with the polyurethane prepolymer. Since the curing agents add weight to the mixture, the cured polyurethane mixtures contain a somewhat smaller percentage of the fluorocarbon compound than that of the prepolymer mixture. When the cured polyurethane contains less than 1% of the fluorocarbon compound, there is insufficient effect on the coefficient of friction for the composition to be useful. If the cured polyurethane contains more than 90% of the fluorocarbon compound, the resulting mixture has insufficient physical strength to be useful.

The fluorocarbon compounds used in this invention should be in the form of small particles. Although a wide variety of particle sizes are useful, particle size should be less than 20 microns. Particles of from one to two microns or smaller are preferred. When the particle size is too large it can be reduced to the desired range by use of mills of various kinds.

Telomers and polymers of fluorinated olefines other than tetrafluoroethylene are of course known which have the molecular weight and melting point properties of the defined fluorocarbon compounds. Typical examples are the chlorotrifluoroethylene polymers sold under the trade name "Kel-F" having wax-like or jelly-like consistency.

Such materials are not useful in this invention however since they tend to be soluble in the polyurethanes and act as plasticizers or softeners. The fluorocarbon compounds used in this invention do not and are not desired to act as softeners or plasticizers in the polyurethanes.

In preparing bearings or other useful articles, the fluorocarbon compound-liquid polyurethane prepolymer dispersion is combined as hereinbefore described with a curing agent and placed in a mold for shaping the composition into the desired shape for use. The polyurethane composition completes curing while in the mold. The mold is somewhat larger than the required dimensions of the finished article to allow for the removal of the hard skin or crust which forms during curing. This skin should be removed since it does not have the desirable properties of the bulk of the solid polymer.

The cured polyurethane-fluorocarbon compositions of this invention find particular use as sleeve bearings for rotating shafts. Sleeve bearings, in general, usually have a housing or pillow block which can be securely connected or anchored to a support by bolts or other suitable connecting devices. The housing or pillow block may be of single piece or split piece construction, depending on the use for the bearing. The sleeve is inserted into the housing or pilow block in order that it will be in direct contact with the rotating shaft which passes through the housing and is supported by the housing. It should be understood, of course, that the application of the novel polyurethanefluorocarbon composition of this invention as sleeves for bearings is not limited in any manner to any particular type of bearing or bearing construction.

Bearings prepared from the cured polymers of this invention are particularly useful in applications where water lubrication is used. Such uses include pumps and pump-motor combinations where the motor is surrounded by water. Such pumps are used in wells, process lines, washing machines, hot water heating systems and the like. Such bearings are useful with water temperatures up to 180° F.

The cured polymers of this invention, particularly those containing higher amounts of the tetrafluoroethylene telomer or degradated polymer, are useful as coatings for metals, glass, wood and concrete where sliding friction is encountered such as drawer slides, sliding doors and windows and similar applications.

Representative examples illustrating the present invention are as follows. All parts are by weight unless otherwise specified.

*Example 1*

An isocyanate modified glycol prepolymer was prepared by reacting one mole of polytetramethylene ether glycol having a number average molecular weight of about 1000 with about two moles of toluene-2,4-diisocyanate for four hours at about 80° C. Then about ten parts of a tetrafluoroethylenemethanol telomer of number average molecular weight of 2000, prepared according to Example 8 of U.S. 3,067,262, were added to 100 parts of the above prepolymer. The mixture was agitated vigorously for at least three minutes. The resulting dispersion was heated at 100° C., degassed for 10 minutes at 5 mm. Hg pressure and then 19.5 parts of molten 3,3'-dichloro-4,4'-diaminodiphenylmethane at 120° C. were added and the two liquids were intimately mixed. The prepolymer mixture contains 9.1% and the cured polymer 7.7% fluorocarbon compound. The mixture was poured into a mold to produce a hollow cylindrical bearing sleeve having dimensions of one inch long x 1.312 inch O.D. x 0.980 inch I.D. The casting was cured for 60 minutes at 100° C., removed from the mold and machined to give an inside diameter of one inch. A similar bearing sleeve was prepared omitting the tetrafluoroethylene telomer from the polyurethane polymer.

Friction tests were conducted on both the above polyurethane bearing sleeve and the fluorocarbon modified polyurethane bearing sleeve by rotating a cold-rolled steel shaft (finished to 12–16 micro-inch, hardness $R_1$ 20–25) within the bearings containing the above bearing sleeves. The bearings were tested under different loads at about 40 r.p.m. which corresponds to a surface velocity of about 10 feet per minute. The following table sets forth the coefficients of friction recorded for each of these bearing sleeves at loads ranging from 50 to 400 p.s.i.

TABLE I

| Bearing Load, p.s.i. | Coefficients of Friction | |
|---|---|---|
| | Polyurethane | Polyurethane with 7.7% Tetrafluoroethylene Telomer (on Total Mixture) |
| 50 | 1.60 | 0.34 |
| 100 | 1.40 | 0.36 |
| 150 | 1.10 | 0.39 |
| 200 | 0.95 | 0.41 |
| 250 | 0.84 | 0.44 |
| 300 | 0.77 | 0.46 |
| 350 | 0.70 | 0.48 |
| 400 | 0.65 | 0.51 |

The polyurethane composition was a moderately hard elastomer having a Shore-A hardness rating of 95.

*Example 2*

An isocyanate modified glycol prepolymer was prepared by reacting a mixture of one mole of polytetramethylene ether glycol having a number average molecular weight of about 1000 and one mole of 1,3-butanediol with about four moles of a mixture of isomeric toluene diisocyanates (80% toluene-2,4-diisocyanate; 20% toluene-2,6-diisocyanate) for four hours at about 80° C. From this prepolymer four bearing sleeves were prepared as follows.

The first bearing sleeve, used as a control in this example, was prepared as follows. One hundred parts of the prepolymer were mixed at 85° C. with 26 parts of 3,3'-dichloro-4,4'-diaminodiphenylmethane and the mixture was held at 100° C. for 60 minutes. The mixture was allowed to cure in a bearing sleeve mold having the same dimensions as those in Example 1. The cured polyurethane was nearly plastic and very hard, Shore–D75.

The second bearing sleeve was formed as follows. A mixture of 79.4 parts of the same prepolymer and 10 parts of finely divided "Teflon-30" (a registered trademark of E. I. du Pont de Nemours and Company for high molecular weight polytetrafluoroethylene) was prepared. The prepolymer was then cured with 20.6 parts of 3,3'-dichloro - 4,4' - diaminodiphenylmethane in the bearing sleeve mold of Example 1. The prepolymer product contained 11.2% and the cured product 9.1% of the polytetrafluoroethylene.

A third bearing sleeve was prepared as follows. A mixture of 79.4 parts of the same prepolymer and 10 parts of the tetrafluoroethylene-methanol telomer powder used in Example 1 was prepared. The prepolymer was then cured with 20.6 parts of 3,3'-dichloro-4,4'-diaminodiphenylmethane in the bearing sleeve mold of Example 1. The prepolymer product contained 11.2% and the cured product 9.1% telomer.

A fourth bearing sleeve was prepared as follows. A mixture of 79.4 parts of the same prepolymer and 50 parts of a 20% dispersion of the tetrafluoroethylene-methanol telomer in 1,1,2-trichloro-1,2,2-trifluoroethane was prepared by mixing the components with agitation. The solvent was removed at 100° C. and 5 mm. Hg pressure. The resulting dispersion was cured in the bearing sleeve mold of Example 1 with 20.6 parts of 3,3'-dichloro-4,4'-diaminodiphenylmethane. The prepolymer product contained 11.2% and the cured product 9.1% telomer.

All four of the above prepared bearing sleeves were machined to one inch I.D. and friction measurements were made in the same manner as Example 1. The results of the friction measurements are given below in Table II.

TABLE II

| Bearing Load (p.s.i.) | Coefficients of Friction | | | |
|---|---|---|---|---|
| | Polyurethane Alone | Polyurethane and 9.1% Polytetrafluoroethylene [a] | Polyurethane and 9.1% Telomer (as Powder) [b] | Polyurethane and 9.1% Telomer (as Dispersion) [b] |
| 50 | 0.36 | 0.24 | 0.23 | 0.23 |
| 100 | 0.34 | 0.25 | 0.22 | 0.22 |
| 150 | 0.35 | 0.25 | 0.21 | 0.21 |
| 200 | 0.36 | 0.26 | 0.20 | 0.20 |
| 250 | 0.35 | 0.26 | 0.19 | 0.19 |
| 300 | 0.33 | 0.26 | 0.19 | 0.19 |
| 350 | 0.31 | 0.27 | 0.19 | 0.19 |
| 400 | | 0.27 | 0.19 | 0.19 |

[a] "Teflon-30".
[b] Form in which telomer was added.

The above results indicate the superiority of the fluorocarbon compounds of molecular weight 500–50,000 over commercial, high molecular weight polytetrafluoroethylene as an additive to polyurethane bearing materials. Note also that there is no difference observed when the telomer is added as a powder or as a dispersion in a volatile solvent.

*Example 3*

An isocyanate modified glycol prepolymer was prepared by reacting one mole of polytetramethylene ether glycol having a number average molecular weight of about 1000 with about 1.6 moles of toluene-2,4-diisocyanate for four hours at about 80° C. To 100 parts of this prepolymer were added 100 parts of a 20% dispersion in 1,1,2-trichloro-1,2,2-trifluoroethane of a tetrafluoroethylene-methylcyclohexane telomer, prepared according to the procedure of Example 1 in U.S. 3,067,262. The tetrafluoroethylene-methylcyclohexane telomer had a number average molecular weight of 3500 and a melting point of 298° C. The telomer dispersion had been pretreated by passing the telomer through a Mantin-Goulin homogenizer mill so that 5% of the solid particles had a size of 2–5 microns and the remainder a size of 1–2 microns. The solvent was removed from the prepolymer-telomer mixture by heating, first at atmospheric pressure, then at reduced pressure with good agitation. The last traces were removed during vacuum degassing at 100° C. and 10 mm. Hg pressure for one hour.

This mixture was cured in one of the following two ways.

*Method A.*—Six parts of molten 3,3'-dichloro-4,4'-diaminodiphenylmethane were added to the total prepolymer-telomer mixture with thorough stirring. The resulting mixture was poured into a flat pan and heated at 100° C. for three hours. The resulting product was a hard white elastomer which was quite slick when the outer crust was removed.

*Method B.*—One part of trimethylolpropane and 3.5 parts of 1,4-butanediol were added to the total prepolymer-telomer mixture of this example. After mixing well, the liquid was poured into a flat pan and heated at 140° C. for six hours. The cured polymer was a soft elastomer that was very slick when the outer skin was removed.

When the procedure for preparing the cured polymer, either by Method A or Method B, is repeated using any of the materials listed below in place of the tetrafluoroethylenemethylcyclohexane telomer, essentially equivalent results are obtained. The tetrafluoroethylene telomers are as follows:

(1) The solid telomer of tetrafluoroethylene and dimethyl disulfide, M.P. 113–116° C., molecular weight 1100, described in Example 2 of U.S. Patent 2,443,003.

(2) The solid telomer of tetrafluoroethylene and methylene chloride, M.P. 230° C., described in Example 3 of U.S. Patent 2,562,547.

(3) The solid telomer of tetrafluoroethylene and 1,1,2,2-tetrachloroethane, M.P. 286° C., described in Example 5 of U.S. Patent 2,562,547.

(4) The solid telomer of tetrafluoroethylene and amylbenzene, M.P. 280° C., described in Example 6 of U.S. Patent 2,562,547.

(5) The solid telomer of tetrafluoroethylene and butane, M.P. 125° C., described in Example 10 of U.S. Patent 2,540,088.

(6) The solid telomer of tetrafluoroethylene and methylformate, M.P. 250–260° C., molecular weight 700, described in Example 1 of U.S. Patent 2,411,158.

*Example 4*

Commercial polytetrafluoroethylene ("Teflon-30") was degraded according to the method described in Example 1 of U.S. Patent 2,496,978. A 7.5% by weight dispersion of the wax-like product obtained was prepared in 1,1,2-trichloro-1,2,2-trifluoroethane in a Mantin-Goulin homogenizer mill. At least 95% of the particles were in the 1–2 micron size range. A mixture of 200 parts of this dispersion and 100 parts of the prepolymer of Example 3 was prepared, the solvent was removed and the liquid degassed as described in Example 3. The prepolymer mixture was then cured as in Method A of Example 3. The prepolymer mixture contained 13.0% and the cured polymer 12.4% by weight of the degraded tetrafluoroethylene polymer. The cured polyurethane polymer, after removing the skin, was extremely slick, showing considerably less stick-slip against glass or paper than does a piece of polymer prepared in the same manner omitting the degraded tetrafluoroethylene polymer.

Very similar results were obtained when the cured polymers containing 7%, 3.5%, and 1% of the degraded tetrafluoroethylene polymer were used in place of the cured polymer containing 12.4% of the degraded tetrafluoroethylene polymer.

*Example 5*

A mixture of six parts 3,3'-dichloro-4,4'-diaminodiphenylmethane and 16 parts of 1,1,11-trihydroeicosafluorodecanol-1, a telomer of tetrafluoroethylene, having a molecular weight of 531 and a melting point of 97° C., prepared by the reaction of tetrafluoroethylene with methanol, as described in U.S. Patent 2,559,628, was mixed with 100 parts of the prepolymer of Example 3. The resulting mixture was degassed at 100° C., then heated for three hours at 100° C. The cured polymer was a clear elastomer. After cooling or flexing, the elastomer became white and quite slippery.

When a similar polymer mixture was prepared using 16 parts 1,1,9-trihydrohexadecafluorononanol-1 (M.P. 67° C., molecular weight 431, prepared in the same manner as the undecanol above), the resulting product was not slippery even if cooled or flexed.

*Example 6*

A mixture of 25 parts of the 20% tetrafluoroethylene-methylcyclohexane telomer dispersion used in Example 3, 2.5 parts of the prepolymer of Example 3 and 100 parts of benzene was heated to drive off the 1,1,2-trichloro-1,2,2-trifluoroethane. The resulting benzene dispersion was then used to prepare thin coatings on aluminum, steel, glass, wood and concrete by dipping, spraying or painting the benzene dispersion onto the surfaces. The polyurethane polymer coating was allowed to cure by exposure to moist air for several days. The coated materials were slippery. These coatings contained 67% telomer–33% polyurethane polymer.

Similar coatings were prepared from benzene dispersions containing (as active ingredients) 75% telomer and 25% polyurethane polymer, 83.3% telomer and 16.7% polyurethane polymer and 91% telomer and 9% polyurethane polymer. The coatings prepared on aluminum, steel, glass, wood and concrete from these compositions were all slippery. It was found that slipperiness of the coatings increased with the increased concentration of the tetrafluoroethylene telomer or degraded polymer in the polyurethane composition. Adhesion to the surfaces became poorer however as the concentration of the tetrafluoroethylene telomer or degraded polymer increased and at concentrations above 91% adhesion was no better than the adhesion of the telomer alone.

*Example 7*

Another method for determining the efficiency of bearing materials is to determine the "PV" limit of the material at various speeds of rotation of a shaft in the bearing. "PV" is the product of pressure in pounds per square inch (p.s.i.) and velocity in feet per minute (f.p.m.). The limit is defined as the point where failure occurs. In Table III below, polyurethane elastomer containing 10% by weight tetrafluoroethylene-methanol telomer is compared with the polyurethane elastomer alone as well as commercial nylon and "Delrin" (a registered trademark for acetal resins obtainable from E. I. du Pont de Nemours and Company), both of which are presently used to a large extent as bearing sleeve materials. The polyurethane elastomer and the telomer are the same as described in Example 2. The "PV" limit for the telomer containing elastomer was defined as the point where surface melting of the elastomer occurred. It was found however that the presence of surface melting did not materially affect the bearing or its operation. "PV" values as high as 20,000 were used without serious deficiencies although surface melting did occur. Wear factors were also determined. It was found that the telomer-containing elastomers had better break-in wear properties, i.e., they tended to wear less when first put into service, than the polyurethane elastomers themselves. Long term wear properties of the telomer-containing polyurethanes were approximately the same as the polyurethanes themselves.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition consisting essentially of a curable liquid polyurethane prepolymer having dispersed therein from about 1% to about 90% by weight, based on the weight of the composition, of small particles of a solid fluorocarbon compound containing at least 90% by weight of a chain of units having the structure —$CF_2CF_2$—, said solid fluorocarbon compound having a molecular weight from about 500 to about 50,000 and a melting point of from 90° C. to 327° C.

2. A solid composition consisting essentially of cured polyurethane having dispersed therein from 1% to 90% by weight, based on the weight of the composition, of small particles of a solid fluorocarbon compound containing at least 90% by weight of a chain of units having the structure —$CF_2CF_2$—, said solid fluorocarbon compound having a molecular weight from about 500 to about 50,000 and a melting point of from 90° C. to 327° C.

3. A sleeve bearing formed from the cured composition described in claim 2.

4. A solid composition consisting essentially of a cured polyurethane having dispersed therein from 1% to 90% by weight, based on the weight of the composition, of a solid fluorocarbon compound having a particle size of from about one to two microns and containing at least 90% by weight of a chain of units having the structure —$CF_2CF_2$—, said solid fluorocarbon compound

TABLE III

| Bearing Material | Velocity, f.p.m. | Pressure, p.s.i. | "PV" Limit, f.p.m.×p.s.i. | Friction Coefficient |
| --- | --- | --- | --- | --- |
| Polyurethane | 10 | 100 | 1,000 | 0.4 |
|  | 40 | 60 | 2,400 | 0.8 |
|  | 100 | 28 | 2,800 | 0.8 |
|  | 400 | 10 | 4,000 | 0.8 |
| Polyurethane+10% Telomer | 10 | 500 | 5,000 | 0.7 |
|  | 40 | 150 | 6,000 | 0.6 |
|  | 100 | 55 | 5,500 | 0.6 |
|  | 400 | 22 | 8,800 | 0.4 |
| Nylon | 10 | 600 | 6,000 | 0.8 |
|  | 40 | 120 | 4,800 | 0.8 |
|  | 100 | 34 | 3,400 | 0.6 |
|  | 400 | 7.5 | 3,000 | 0.7 |
| Acetal [Du Pont's Delrin] | 10 | 400 | 4,000 |  |
|  | 40 | 80 | 3,200 |  |
|  | 100 | 30 | 3,000 | 0.5 |
|  | 400 | 6 | 2,400 |  |

The above examples demonstrate that wide ranges of concentrations of specific fluorocarbon compounds containing 90% by weight of —$CF_2CF_2$— chain units and having a molecular weight of 500–50,000 and a melting point between 90° C.–327° C. can be used to modify polyurethanes. The above examples also demonstrate that a wide variety of fluorocarbon compounds have properties within the defined structure, molecular weight, and melting point range find use in modifying and improving the physical characteristics of polyurethanes. The above examples also demonstrate that polyurethanes modified by these fluorocarbon compounds are surprisingly superior to those of the art.

It is to be understood that the preceding examples are representative and that said examples may be varied within the scope of the total specification, as understood by one skilled in the art, to produce essentially the same result. It should also be understood that the defined novel polyurethane-fluorocarbon compositions are not limited to any particular use, but can be used wherever their novel properties find application.

having a molecular weight from about 500 to 50,000 and a melting point of from 90° C. to 327° C.

5. A sleeve bearing formed from the cured composition described in claim 4.

6. The composition of claim 1 wherein the solid fluorocarbon compound is a tetrafluoroethylene-methanol telomer.

References Cited

UNITED STATES PATENTS

| | | | |
| --- | --- | --- | --- |
| 2,777,783 | 1/1957 | Welch | 260—853 |
| 2,858,298 | 10/1958 | Burt | 260—859 |
| 2,976,257 | 3/1961 | Dawe et al. | 260—858 |
| 3,067,262 | 12/1962 | Brady | 106—38.22 |
| 3,102,862 | 9/1963 | Green et al. | 252—58 |
| 3,148,234 | 9/1964 | Boyer | 260—859 |
| 3,293,203 | 12/1966 | Paulus | 260—859 |

MURRAY TILLMAN, *Primary Examiner.*

J. C. BLEUTGE, *Assistant Examiner.*